(12) United States Patent
Merziger

(10) Patent No.: US 6,302,153 B1
(45) Date of Patent: Oct. 16, 2001

(54) ANTISTATIC TUBE BASED ON POLYAMIDES FOR TRANSPORTING PETROL

(75) Inventor: Joachim Merziger, Evreux (FR)

(73) Assignee: Atofina, Puteaux (FR)

( * ) Notice: Subject to any disclaimer, the term of this patent is extended or adjusted under 35 U.S.C. 154(b) by 0 days.

(21) Appl. No.: 09/526,536

(22) Filed: Mar. 16, 2000

(30) Foreign Application Priority Data

Mar. 16, 1999 (FR) .................................................. 99 03215

(51) Int. Cl.⁷ ...................................................... F16L 11/04
(52) U.S. Cl. ........................ 138/137; 138/140; 138/141; 138/DIG. 7
(58) Field of Search .................................... 138/137, 141, 138/140, DIG. 7; 428/36.6–36.9, 36.91

(56) References Cited

U.S. PATENT DOCUMENTS

| | | | |
|---|---|---|---|
| 4,746,574 | | 5/1988 | Hattori et al. ........................ 428/409 |
| 5,076,329 | * | 12/1991 | Brunnhofer ........................... 138/137 |
| 5,219,003 | * | 6/1993 | Kerschbaumer .................. 138/126 X |
| 5,342,886 | * | 8/1994 | Glotin et al. ............................ 525/66 |
| 5,937,911 | * | 8/1999 | Kodama et al. ...................... 138/137 |
| 6,068,934 | * | 5/2000 | Vandekerckhove et al. ...... 428/476.1 |
| 6,087,020 | * | 7/2000 | Vandekerckhove et al. ...... 428/476.1 |
| 6,117,561 | * | 9/2000 | Jacquemet et al. ................ 428/475.5 |
| 6,180,197 | * | 1/2001 | Nie et al. ............................ 428/36.91 |

FOREIGN PATENT DOCUMENTS 0 816 460   1/1998  (EP) .

* cited by examiner

Primary Examiner—Patrick Brinson
(74) Attorney, Agent, or Firm—Millen, White, Zelano & Branigan, P.C.

(57) ABSTRACT

The invention relates to a tube comprising an inner layer and an outer layer, the inner layer comprising a polyamide or a polyamide/polyolefin blend having a polyamide matrix, this inner layer being filled with electrically conductive carbon black (electro.C), the outer layer comprising a polyamide. These tubes are particularly impermeable to any petrol containing alcohol.

20 Claims, No Drawings

ANTISTATIC TUBE BASED ON POLYAMIDES FOR TRANSPORTING PETROL

CROSS REFERENCE TO RELATED APPLICATION

This application is related to a concurrently filed application entitled, "Multilayer Tube Based On Polyamides, For Transporting Petrol" the inventors being, Jean-Marc Durand, Jacques Thomasset, Joachim Merziger and Philippe Bussi, Attorney Docket Number ATOCM-169, based on priority French application 99/03214 filed Mar. 16, 1999.

BACKGROUND OF THE INVENTION

The present invention relates to tubes based on polyamides for transporting petrol and more particularly to tubes for conveying petrol from the tank of motor vehicles to the engine and to the hoses for transporting hydrocarbons in service stations.

For safety and environmental protection reasons, motor vehicle manufacturers require petrol tubes to have mechanical characteristics of strength and flexibility and enhanced permeability-resistance characteristics. The tubes must have the lowest possible permeability to petrol products and to their additives, particularly methanol and ethanol.

Polyamides have all these properties, however, in order to have good low-temperature mechanical properties, polyamides must be plasticized. But plasticized polyamides are less impermeable to hydrocarbons than unplasticized polyamides, especially with respect to lead-free petrols.

Patent EP 0,731,308 describes a tube based on polyamides for transporting petrol. This tube comprises an inner layer made of a polyamide/polyolefin blend having a polyamide matrix and an outer layer made of a polyamide. A binder layer and a layer of an ethylene-vinyl alcohol copolymer (EVOH) may be placed between the inner layer and the outer layer.

It is already known from Patent Application EP 0,781,799 that in motor vehicles, under the effect of the injection pump, the petrol flows at high speed in the pipes connecting the engine to the tank. In certain cases, the friction between the petrol and the internal wall of the tube can generate electrostatic charges, the accumulation of which may result in an electrical discharge (a spark) capable of igniting the petrol, with catastrophic consequences (an explosion). It is therefore necessary to limit the surface resistivity of the internal face of the tube to a value of generally less than $10^6$ ohms/square. It is known to lower the surface resistivity of polymeric resins or materials by incorporating conductive and/or semiconductive materials into them, such as carbon black, steel fibres, carbon fibres, and particles (fibres, platelets or spheres) metallized with gold, silver or nickel.

Among these materials, carbon black is more particularly used, for economic and processability reasons. Apart from its particular electrical conductivity properties, carbon black behaves as a filler such as, for example, talc, chalk or kaolin.

SUMMARY OF THE INVENTION

Thus, those skilled in the art know that when the filler content increases, the viscosity of the polymer/filler blend increases. Likewise, when the filler content increases, the flexural modulus of the filled polymer increases. These known and predictable phenomena are explained in "Handbook of Fillers and Reinforcements for Plastics", edited by H. S. Katz and J. V. Milewski—Van Nostrand Reinhold Company—ISBN 0-442-25372-9, see in particular Chapter 2, Section II for fillers in general and Chapter 16, Section VI for carbon black in particular.

As regards the electrical properties of carbon black, the technical report "KETJENBLACK EC—BLACK 94/01" by Akzo Nobel indicates that the resistivity of the formulation drops very suddenly when a critical carbon black content, called the percolation threshold, is reached. When the carbon black content increases further, the resistivity rapidly decreases until it reaches a stable level (plateau region). It is therefore preferred, for a given resin, to operate in the plateau region in which a metering error will have only a slight effect on the resistivity of the compound.

The applicant has now discovered another multilayer tube based on polyamides, which has a very low permeability to petrol and has very good mechanical properties, while at the same time being electrically conductive in order to prevent any accumulation of electrostatic charges that might cause sparks.

The subject of the present invention is a tube comprising an inner layer and an outer layer, the inner layer comprising a polyamide/polyolefin blend having a polyamide matrix, this inner layer being filled with electrically conductive carbon black (electro.C), the outer layer comprising a polyamide.

More specifically, the present invention is a multilayered tube based on polyamides, characterized in that it comprises, in its radial direction, from the inside to the outside:

an inner layer formed from a polyamide or a polyamide/polyolefin blend having a polyamide matrix, this layer containing a dispersed electrically conductive, carbon black filler, producing a surface resistivity of less than $10^6 \ \Omega/\square$, an intermediate layer formed from a polyamide or a polyamide/ polyolefin blend having a polyamide matrix, this layer not containing electrically conductive carbon black or an electrically significant amount of this carbon black, a binder layer, a polyamide outer layer, the above layers adhering to each other in their respective contact region.

Preferably, the tube includes an additional layer made of EVOH placed between the polyamide outer layer and the intermediate layer. This additional layer ensures that the tube has a lower permeability to hydrocarbons and their additives.

With regard to the polyamide or the polyamide polyolefin blend of the inner layer or the intermediate layer, any polyamide may be used.

The term "polyamide" should be understood to mean products of the condensation:

of one or more amino acids, such as aminocaproic, 7-aminoheptanoic, 11-aminoundecanoic and 12-aminododecanoic acids or of one or more lactams, such as caprolactam, oenantholactam and lauryllactam;

of one or more salts or mixtures of diamines such as hexamethylenediamine, dodecamethylenediamine, metaxylylenediamine, bis(p-aminocyclohexyl)methane and trimethylhexamethylenediamine with diacids such as isophthalic, terephthalic, adipic, azelaic, suberic, sebacic and dodecanedicarboxylic acids; or mixtures of all these monomers, which lead to copolyamides.

Polyamide blends may be used. Advantageously, PA-6 and PA-6,6 and PA-12 are used.

With regard to the polyolefins of the polyamide polyolefin blend in the inner layer or the intermediate layer, the term "polyolefins" should be understood to. mean polymers comprising olefin units such as, for example, ethylene, propylene and 1-butene units, and their higher homologues.

By way of examples, mention may be made of:

polyethylene, polypropylene and copolymers of ethylene with α-olefins, these products possibly being grafted by unsaturated carboxylic acid anhydrides, such as maleic anhydride or by unsaturated epoxides, such as glycidyl methacrylate;

copolymers of ethylene with at least one product chosen from (i) unsaturated carboxylic acids, their salts and their esters, (ii) vinyl esters of saturated carboxylic acids, (iii) unsaturated dicarboxylic acids, their salts, their esters, their half-esters and their anhydrides, and (iv) unsaturated epoxides, these ethylene copolymers possibly being grafted by unsaturated dicarboxylic acid anhydrides or unsaturated epoxides;

styrene/ethylene-butylene/styrene block copolymers (SEBS), optionally maleized.

Blends of two or more of these polyolefins may be used. It is advantageous to use:

polyethylene;

copolymers of ethylene with an α-olefin;

ethylene/alkyl (meth)acrylate copolymers;

ethylene/alkyl (meth)acrylate/maleic anhydride copolymers, the maleic anhydride being grafted or copolymerized;

ethylene/alkyl (meth)acrylate/glycidyl methacrylate copolymers, the glycidyl methacrylate being grafted or copolymerized, polypropylene In order to facilitate the formation of the polyamide matrix, and if the polyolefins have few or no functional groups able to facilitate the compatibilization, it is recommended to add a compatibilizer.

The compatibilizer is a product known per se for compatibilizing polyamides and polyolefins.

As examples, mention may be made of:

polyethylene, polypropylene, ethylene-propylene copolymers and ethylene-butylene copolymers, all these products being grafted by maleic anhydride or glycidyl methacrylate;

ethylene/alkyl (meth)acrylate/maleic anhydride copolymers, the maleic anhydride being grafted or copolymerized;

ethylene/vinyl acetate/maleic anhydride copolymers, the maleic anhydride being grafted or copolymerized;

the above two copolymers in which the maleic anhydride is replaced with glycidyl methacrylate;

ethylene/(meth)acrylic acid copolymers and possibly their salts;

polyethylene, polypropylene or ethylene-propylene copolymers, these polymers being grafted by a product having a site which reacts with amines, these grafted copolymers then being condensed with polyamides or polyamide oligomers having a single amine end group.

These products are described in Patents FR 2,291,225 and EP 342,066, the contents of which are incorporated in the present application.

The amount of polyamide forming the matrix in the inner layer may be between 55 and 95 parts per 5 to 45 parts of polyolefin.

The amount of compatibilizer is the amount which is sufficient for the polyolefin to be dispersed in the form of nodules in the polyamide matrix. It may represent up to 20% by weight of the polyolefin. These polymers of the inner layer are manufactured by blending the polyamide, the polyolefin and optionally a compatibilizer using the standard-melt-blending techniques (twin-screw, Buss, single-screw extruders).

These polyamide/polyolef in blends of the inner layer may be plasticized and may optionally contain fillers such as carbon black, etc.

Such polyamide/polyolefin blends are described in U.S. Pat. No. 5,342,886.

Hereinafter are described preferred forms of the polyamide polyolefin blend having a polyamide matrix. This blend containing conductive black carbon can be used in the inner layer and without conductive black carbon in the intermediate layer.

According to a first preferred form of the invention, the polyolef in comprises (i) a high density polyethylene (HDPE) and (ii) a mixture of a polyethylene (C1) and a polymer (C2) chosen from elastomers, very low density polyethylenes and ethylene copolymers, the mixture (C1)+(C2)-being co-grafted with an unsaturated carboxylic acid.

According to a second preferred form of the invention, the polyolefin comprises (i) polypropylene and (ii) a polyolefin which results from the reaction of a polyamide (C4) with a copolymer (C3) comprising propylene and a grafted or copolymerized unsaturated monomer X.

According to a third preferred form of the invention, the polyolefin comprises (i) a polyethylene of LLDPE, VLDPE or metallocene type and (ii) an ethylene-alkyl (meth) acrylate-maleic anhydride copolymer.

As regards the first form, the proportions are advantageously as follows (by weight):

60 to 70% of polyamide, 5 to 15% of the co-grafted mixture of (C1) and (C2)

the remainder being high density polyethylene.

As regards the high density polyethylene, its density is advantageously between 0.940 and 0.965 and the MFI between 0.1 and 5 g/10 min (190° C., 2.16 kg).

The polyethylene (C1) can be chosen from the polyethylenes mentioned above. Advantageously, (C1) is a high density polyethylene (HDPE) with a density of between 0.940 and 0.965. The MFI of (C1) is (under 2.16 kg—190° C.). between 0.1 and 3 g/10 min.

The copolymer (C2) can be, for example, an ethylene/propylene elastomer (EPR) or ethylene/propylene/diene elastomer (EPDM). (C2) can also be a very low density polyethylene (VLDPE) which is either an ethylene homopolymer or a copolymer of ethylene and of an α-olefin. (C2) can also be a copolymer of ethylene with at least one product chosen from (i) unsaturated carboxylic acids, salts thereof, esters thereof, (ii) vinyl esters of saturated carboxylic acids, (iii) unsaturated dicarboxylic acids, their salts, their esters, their hemiesters and their anhydrides. Advantageously, (C2) is an EPR.

Advantageously, 60 to 95 parts of (C1) are used per 40 to 5 parts of (C2).

The mixture of (C1) and (C2) is grafted with an unsaturated carboxylic acid, i.e. (C1) and (C2) are co-grafted. It would not constitute a departure from the context of the invention to use a functional derivative of this acid. Examples of unsaturated carboxylic acids are those containing from 2 to 20 carbon atoms, such as acrylic acid, methacrylic acid, maleic acid, fumaric acid or itaconic acid. The functional derivatives of these acids comprise, for example, the anhydrides, the ester derivatives, the amide derivatives, the imide derivatives and the metal salts (such as the alkali metal salts) of unsaturated carboxylic acids.

Unsaturated dicarboxylic acids containing 4 to 10 carbon atoms and functional derivatives thereof, particularly their anhydrides, are grafting monomers that are particularly preferred. These grafting monomers comprise, for example, maleic acid, fumaric acid, itaconic acid, citraconic acid, allylsuccinic acid, 4-cyclohexene-1,2-dicarboxylic acid, 4-methyl-4-cyclohexene-1,2-dicarboxylic acid, bicyclo(2,2,1)hept-5-ene-2,3-dicarboxylic acid, x-methylbicyclo(2,2,1)hept-5-ene-2,3-dicarboxylic acid, maleic anhydride, itaconic anhydride, citraconic anhydride, allylsuccinic anhydride, 4-cyclohexene-1,2-dicarboxylic anhydride, 4-methylene-4-cyclohexene-1,2-dicarboxylic anhydride, bicyclo(2,2,1)hept-5-ene-2,3-dicarboxylic anhydride and x-methylbicyclo(2,2,1)hept-5-ene-2,2-dicarboxylic anhydride. Maleic anhydride is advantageously used.

Various known processes can be used to graft a grafting monomer onto the mixture of (C1) and (C2). For example, this can be carried out by heating the polymers (C1) and (C2) to high temperature, about 150° C. to about 300° C., in the presence or absence of a solvent with or without a radical-generator.

In the mixture of (C1) and (C2) modified by grafting, obtained in the abovementioned manner, the amount of the grafting monomer can be chosen in an appropriate manner, but is preferably from 0.01 to 10%, better still from 600 ppm to 2%, relative to the weight of grafted (C1) and (C2). The amount of the grafted monomer is determined by assaying the succinic functions by FTIR spectroscopy. The MFI of (C1) and (C2) which have been co-grafted is from 5 to 30 g/10 min (190° C.—2.16 kg), preferably 13 to 20.

Advantageously, the mixture of co-grafted (C1) and (C2) is such that the $MFI_{10}/MFI_2$ ratio is greater than 18.5, $MFI_{10}$ denoting the flow rate at 190° C. under a load of 10 kg and $MFI_2$ denoting the flow rate under a load of 2.16 kg. Advantageously, the $MFI_{20}$ of the mixture of co-grafted polymers (C1) and (C2) is less than 24. $MFI_{20}$ denotes the flow rate at 190° C. under a load of 21.6 kg.

As regards the second form of the invention, the proportions are advantageously as follows (by weight):
60 to 70% of polyamide,
20 to 30% of polypropylene
3 to 10% of a polyolefin which results from the reaction of a polyamide (C4) with a copolymer (C3) comprising propylene and a grafted or copolymerized unsaturated monomer X.

The MFI of the polypropylene is advantageously less than 0.5 g/10 min (230° C.—2.16 kg) and preferably between 0.1 and 0.5. Such products are described in EP 647 681.

The grafted product of this second form of the invention is now described. To begin with, (C3) is prepared, which is either a copolymer of propylene and of an unsaturated monomer X or a polypropylene onto which is grafted an unsaturated monomer X. X is any unsaturated monomer which can be copolymerized with the propylene or grafted onto the polypropylene and which has a function that can react with a polyamide. This function can be, for example, a carboxylic acid, a dicarboxylic acid anhydride or an epoxide. As examples of monomers X, mention may be made of (meth)acrylic acid, maleic anhydride and unsaturated epoxides such as glycidyl (meth)acrylate. Maleic anhydride is advantageously used. As regards the grafted polypropylenes, X can be grafted onto polypropylene homo- or copolymers, such as ethylene-propylene copolymers predominantly containing propylene (in moles). Advantageously, (C3) is such that X is grafted. The grafting is an operation which is known per se. (C4) is a polyamide or a polyamide oligomer. Polyamide oligomers are described in EP 342 066 and FR 2 291 225. The polyamides (or oligomers) (C4) are the products of condensation of the monomers already mentioned above. Mixtures of polyamides can be used. PA-6, PA-11, PA 12, the copolyamide containing units 6 and units 12 (PA-6/12) and the copolyamide based on caprolactam, hexamethylenediamine and adipic acid (PA-6/6.6) are advantageously used. The polyamides or oligomers (C4) can contain acid, amine or monoamine endings. In order for the polyamide to contain a monoamine ending, it suffices to use a chain-limiter of formula

in which:
$R_1$ is hydrogen or a linear or branched alkyl group containing up to 20 carbon atoms,
$R_2$ is a group containing up to 20 linear or branched alkyl or alkenyl carbon atoms, a saturated or unsaturated cycloaliphatic radical, an aromatic radical or a combination of the above. The limiter can be, for example, laurylamine or oleylamine.

Advantageously, (C4) is a PA-6, a PA-11 or a PA-12. The proportion of C4 in C3+C4 by weight is advantageously between 0.1 and 60%. The reaction of (C3) with (C4) is preferably carried out in the molten state. For example, (C3) and (C4) can be blended in an extruder at a temperature generally of between 230 and 250° C. The average residence time of the molten material in the extruder can be between 10 seconds and 3 minutes and preferably between 1 and 2 minutes.

As regards the third form, the proportions are advantageously as follows (by weight):
60 to 70% of polyamide,
5 to 15% of an ethylene-alkyl (meth)acrylate-maleic anhydride copolymer.

The remainder is a polyethylene of LLDPE, VLDPE or metallocene type; advantageously, the density of this polyethylene is between 0.870 and 0.925, and the MFI is between 0.1 and 5 (190° C.—2.16 kg).

Advantageously, the ethylene-alkyl (meth)acrylate-maleic anhydride copolymers comprise from 0.2 to 10% by weight of maleic anhydride, up to 40% and preferably 5 to 40% by weight of alkyl (meth)acrylate. Their MFI is between 2 and 100 (190° C.—2.16 kg). The term "alkyl (meth)acrylate" denotes advantageously C1 to C8 alkyl methacrylates and acrylates and can be chosen from methyl acrylate, ethyl acrylate, n-butyl acrylate, isobutyl acrylate, 2-ethylhexyl acrylate, cyclohexyl acrylate, methyl methacrylate and ethyl methacrylate. The melting point is between 80 and 120° C. These copolymers are commercially available. They are produced by radical-mediated polymerization at a temperature which can be between 200 and 2500 bar.

By way of example, the following blends (in wt %) may also be used:
1)
55 to 70% of PA-6,
5 to 15% of an ethylene-propylene copolymer containing mostly polypropylene and grafted by maleic anhydride and then subsequently condensed with monoaminated caprolactam oligomers,
the balance to 100% being polypropylene;
2)
55 to 70% of PA-6,
5 to 15% of at least one copolymer of ethylene with (i) an alkyl (meth)acrylate or a vinyl ester of an unsaturated carboxylic acid and (ii) an unsaturated carboxylic acid anhydride or a grafted or copolymerized unsaturated epoxy, the balance being polyethylene.

3)

55 to 70% of PA-6

5 to 15% of polyethylene or copolymer of ethylen and alphaolefin grafted with maleic anhydride or glycidyl methacrylate the balance being high density polyethylen.

The polyamide of the outer layer may be chosen from the polyamides mentioned above for the inner layer. Advantageously, nylon-11 or nylon-12 may be used. Advantageously, the polyamide of the outer layer is plasticized.

Standard plasticizers, such as butyl benzene sulphonamide (BBSA) and polymers comprising polyamide blocks and polyether blocks may be used. These block polymers result from the condensation of polyamide blocks having carboxylic end groups with either polyether diols or polyether diamines, or a blend of these polyethers. This outer layer may also contain antioxidants and possibly electrically conductive fillers such as carbon black.

The tubes according to the present invention include, between their outer layer and inner layer which were described above, two or three other layers. Each layer of the same tube adheres strongly to its immediately adjacent layer or layers. This is because a tube which does not have mechanical integrity between the layers cannot be folded or bent easily by hot forming; in this case, the thinnest material wrinkles during the operation.

In the case of a multilayer tube according to the present invention, the layer which follows the carbon-black-filled inner layer, in a radial direction of the tube, from the inside to the outside does not contain electrically conductive filler or an electrically significant amount of carbon black. The expression "electrically significant amount" should be understood to mean an amount such that it produces a surface resistivity on the tube of less than or equal to $10^9 \Omega/\square$.

This layer essentially free of electrically conductive carbon black therefore consists of polyamide or a polyamide/polyolefin blend having a polyamide matrix chosen from those described above. Advantageously this layer consists of a polyamide polyolefin blend.

Since the inner layer and the next layer have polymeric compositions of the same nature, they adhere strongly to each other.

The tubes of the invention may be produced by coextrusion.

Provision is made for the tubes according to the present invention to have a binder layer immediately after the polyamide outer layer in the radial direction of the tube from the outside towards the inside.

The binder layer makes it possible to achieve good adhesion between the polyamide outer layer and the EVOH layer or the layer of polyamide/polyolefin blend having a polyamide matrix.

By way of examples of binders, mention may be made of: polyethylene, polypropylene, copolymers of ethylene with at least one alpha-olefin, and blends of these polymers, all these polymers being grafted by unsaturated carboxylic acid anhydrides such as, for example, maleic anhydride. It is also possible to use blends of these grafted polymers and of these ungrafted polymers;

copolymers of ethylene with at least one product chosen from (i) unsaturated carboxylic acids, their salts and their esters, (ii) vinyl esters of saturated carboxylic acids, (iii) unsaturated dicarboxylic acids, their salts, their esters, their half-esters and their anhydrides and (iv) unsaturated epoxides, these copolymers possibly being grafted by unsaturated dicarboxylic acid anhydrides, such as maleic anhydride, or by unsaturated epoxides, such as glycidyl methacrylate.

It is also possible to use a binder as described in Patent Application EP 0,816,460 Al.

According to another form of the invention, a layer of a polymer comprising ethylene units and vinyl alcohol units (EVOH) may be placed between the inner and outer layers.

The following structures may be used:

PA outer layer/binder/PA or PA-PE blend/PA or PA-PE blend filled with electrically conductive carbon black;

PA outer layer/binder/EVOH/PA or PA-PE blend/PA or PA-PE blend filled with electrically conductive carbon black.

The binder may be chosen from the abovementioned grafted polymers and some of these are sold by Elf Atochem S.A. under the trademark OREVAC®.

The PA-PE blend with a PA matrix may be chosen from products sold by Elf Atochem S.A. under the trademark ORGALLOY®.

The PA or PA-PE blend with a PA matrix containing electrically conductive carbon black is obtained by mixing the constituents in a hot mixer or else in an extruder.

Advantageously, the inner layer filled with electrically conductive carbon black has a thickness ranging from 25 to 300 μm and preferably from 50 to 150 μm.

The next layer going towards the outside, and not containing electrically conductive carbon black or not containing an electrically significant amount of it, generally has a thickness of at least 50 μm and preferably of 50 to 500 μm.

The binder layer generally has a thickness of at least 10 μm and preferably 20 to 100 μm.

The outer layer generally has a thickness of at least 300 μm and preferably 400 to 800 μm.

The optional EVOH additional layer has a thickness of at least 20 μm and preferably of 20 to 200 μm.

Preferably, the tube according to the present invention is characterized by an outside diameter ranging from 6 to 12 mm and a total thickness of 0.495 mm to 1.90 mm, a thickness of 25 to 300 μm for the inner layer filled with electro.C, a thickness of 50 to 500 μm for the intermediate layer, a thickness of 20 to 100 μm for the binder layer, a thickness of 400 to 800 μm for the outer layer, and, for the optionally present EVOH layer:

a thickness of 20 to 200 μm.

These multilayer tubes may be cylindrical, with a constant diameter, or annulate.

Conventionally, these tubes may include protective sheaths, especially those made of rubber, in order to protect them from hot spots in the engine.

With regard to the tubes used as hoses in service stations, the outside diameter is generally from 20 to 120 mm and their thickness from 0.8 to 14 mm. The thicknesses of the binder layer and the inner layer remain the same as those mentioned above. The hoses may be reinforced by any of the usual methods.

The invention will be more clearly understood with the aid of the following examples given purely by way of illustration.

EXAMPLES

Two tubes each having an outside diameter of 8 mm and a total thickness of 1 mm, were manufactured by coextrusion.

EXAMPLE 1

The tube has the following structure, starting from the outer layer:

PA 12/OREVAC®/ORGALLOY®/ORGALLOY®+electro.C.

The thicknesses in µm of these layers mentioned in succession in the same direction are:

475/50/375/100.

EXAMPLE 2

The tube has the following structure, starting from the outer layer:

PA 12/OREVAC®/EVOH/ORGALLOY®/ORGALLOY®+electro.C.

The thicknesses in µm of these layers mentioned in succession in the same direction are:

475/50/100/275/100.

The preceding examples can be repeated with similar success by substituting the generically or specifically described reactants and/or operating conditions of this invention for those used in the preceding examples. Also, the preceding specific embodiments are to be construed as merely illustrative, and not limitative of the remainder of the disclosure in any way whatsoever.

The entire disclosure of all applications, patents and publications, cited above and below, and of corresponding French application 99/03215, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A multilayer tube based on polyamides, comprising, in its radial direction, from the inside to the outside:
    an inner layer formed from a polyamide or a polyamide/polyolefin blend having a polyamide matrix, said inner layer containing a dispersed electrically conductive carbon black filler, producing a surface resistivity of less than $10^6$ Ω/□,
    an intermediate layer in contact with said inner layer, said intermediate layer being formed from a polyamide/polyolefin blend having a polyamide matrix, said intermediate layer not containing electrically conductive carbon black or an electrically significant amount of said carbon black,
    a binder layer, and
    a polyamide outer layer,
    the above layers adhering to each other in their respective contact region.

2. A multilayer tube according to claim 1, further comprising an additional layer made of EVOH placed between the polyamide outer layer and the intermediate layer.

3. A multilayer tube according to claim 1, characterized by an outside diameter ranging from 6 to 12 mm and a total thickness of 0.495 mm to 1.90 mm,
    a thickness of 25 to 300 µm for the inner layer filled with electro.C,
    a thickness of 50 to 500 µm for the intermediate layer,
    a thickness of 20 to 100 µm for the binder layer, and
    a thickness of 400 to 800 µm for the outer layer.

4. A multilayer tube according to claim 2, characterized by an outside diameter ranging from 6 to 12 mm and a total thickness of 0.495 mm to 1.90 mm,
    a thickness of 25 to 300 µm for the inner layer filled with electro.C,
    a thickness of 50 to 500 µm for the intermediate layer,
    a thickness of 20 to 100 µm for the binder layer,
    a thickness of 400 to 800 µm for the outer layer, and
    a thickness of 20 to 200 µm for the EVOH layer.

5. A multilayer tube according to claim 1, wherein said inner layer is formed from a polyamide/polyolefin blend having a polyamide matrix.

6. A multilayer tube according to claim 2, wherein said inner layer is formed from a polyamide/polyolefin blend having a polyamide matrix.

7. A multilayer tube according to claim 3, wherein said inner layer is formed from a polyamide/polyolefin blend having a polyamide matrix.

8. A multilayer tube according to claim 4, wherein said inner layer is formed from a polyamide/polyolefin blend having a polyamide matrix.

9. A multilayer tube according to claim 5, wherein said polyamide/polyolefin blend having a polyamide matrix in the inner layer is the same as the polyamide/polyolefin blend having a polyamide matrix in the intermediate layer.

10. A multilayer tube according to claim 6, wherein said polyamide/polyolefin blend having a polyamide matrix in the inner layer is the same as the polyamide/polyolefin blend having a polyamide matrix in the intermediate layer.

11. A multilayer tube according to claim 7, wherein said polyamide/polyolefin blend having a polyamide matrix in the inner layer is the same as the polyamide/polyolefin blend having a polyamide matrix in the intermediate layer.

12. A multilayer tube according to claim 8, wherein said polyamide/polyolefin blend having a polyamide matrix in the inner layer is the same as the polyamide/polyolefin blend having a polyamide matrix in the intermediate layer.

13. A multilayer tube according to claim 9, wherein said polyolefin is polyethylene.

14. A multilayer tube according to claim 10, wherein said polyolefin is polyethylene.

15. A multilayer tube according to claim 11, wherein said polyolefin is polyethylene.

16. A multilayer tube according to claim 12, wherein said polyolefin is polyethylene.

17. A multilayer tube comprising:
    an innermost layer formed from a polyamide/polyolefin blend having a polyamide matrix, said innermost layer containing a dispersed electrically conductive carbon black filler, producing a surface resistivity of less than $10^6$ Ω/□, and an intermediate layer in contact with said innermost layer, said intermediate layer being a polyamide/polyolefin blend having a polyamide matrix, said intermediate layer not containing electrically conductive carbon black or an electrically significant amount of said carbon black.

18. A multilayer tube according to claim 17, wherein the thickness of the innermost layer is 25 to 300 µm and the thickness of the intermediate layer is 50 to 500 µm.

19. A multilayer tube according to claim 18, wherein said polyamide/polyolefin blend having a polyamide matrix is the same in both the innermost layer and the intermediate layer.

20. A multilayer tube according to claim 19, further comprising an EVOH layer having a thickness of 20 to 200 µm.

* * * * *